Patented Mar. 24, 1925.

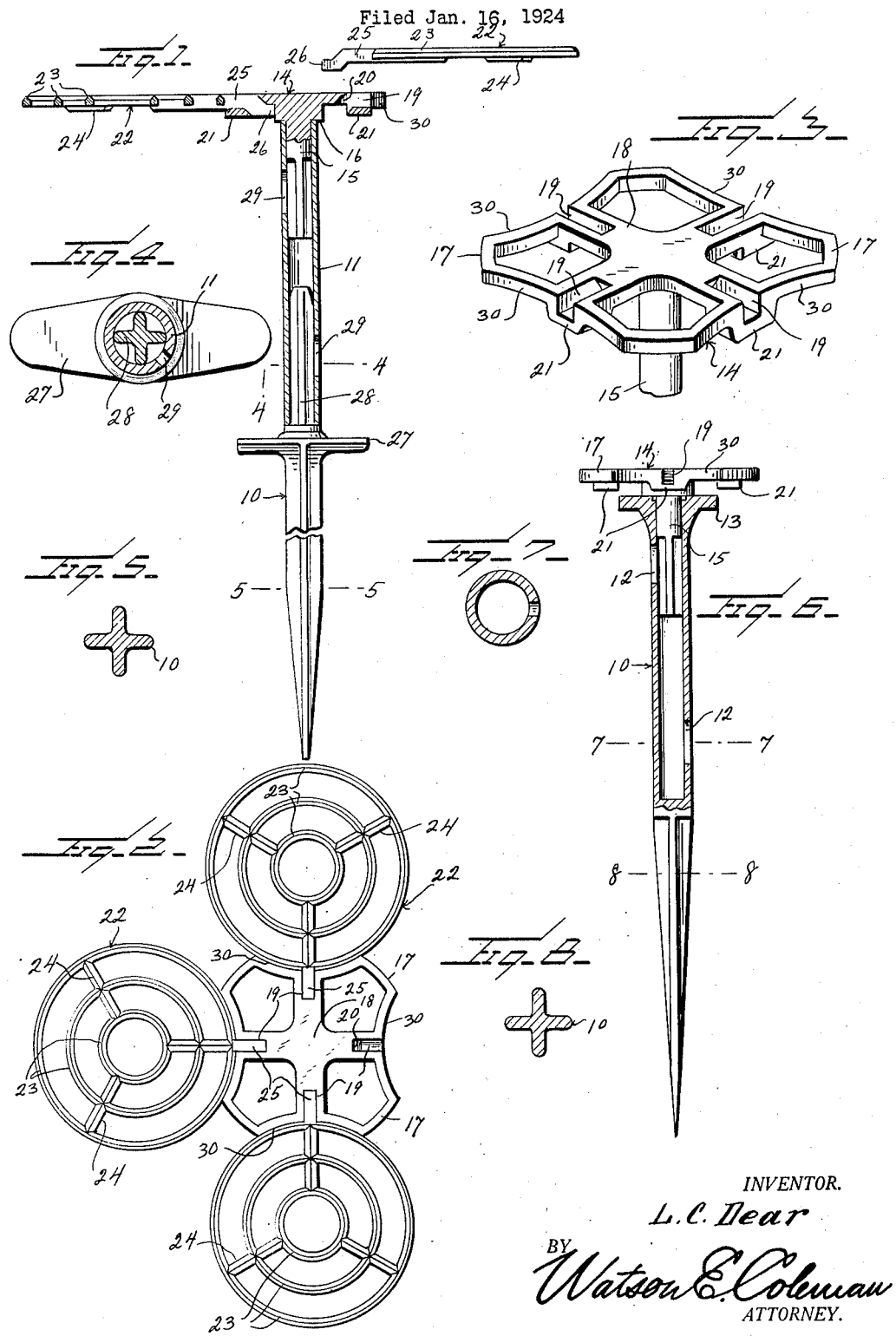

1,530,815

UNITED STATES PATENT OFFICE.

LUKE C. DEAR, OF BUTTE, MONTANA.

CAMP COOKER AND UTENSIL SUPPORT.

Application filed January 16, 1924. Serial No. 686,602.

*To all whom it may concern:*

Be it known that I, LUKE C. DEAR, a citizen of the United States, residing at Butte, in the county of Silver Bow and State of Montana, have invented certain new and useful Improvements in Camp Cookers and Utensil Supports, of which the following is a specification, reference being had to the accompanying drawings.

This invention relates to cooking appliances, and particularly to a support for kettles, pots, pans, etc.

One of the objects of the invention is to provide a very compact device of this character which includes a staff or stake adapted to be forced into the ground and around which a fire may be built, and a series of grid or utensil supports detachably mounted upon the stake.

A further object is to provide a device of this character wherein the utensil supports are themselves detachable so that one or more may be used.

A still further object is to provide a structure of this character in which the supporting grids are rotatable around the stake so that any one of the pots or pans may be turned into convenient position for manipulating.

Another object is to provide a device of this character which is so constructed that there may be a circulation of cool air upward through the upper portion of the central stake, which central stake may be made in two sections for convenience in transportation.

Other objects will appear in the course of the following description.

My invention is illustrated in the accompanying drawing, wherein:—

Figure 1 is a fragmentary vertical sectional view of my improved cooker and utensil support;

Figure 2 is a top plan view of the support shown in Figure 1;

Figure 3 is a perspective view of the head 18 with the spindle;

Figure 4 is a section on the line 4—4 of Figure 1;

Figure 5 is a section on the line 5—5 of Figure 1;

Figure 6 is a longitudinal section through the supporting staff, showing a modification thereof;

Figure 7 is a section on the line 7—7 of Figure 6;

Figure 8 is a section on the line 8—8 of Figure 6.

Referring to these drawings, 10 designates generally the stake or staff which, as illustrated, is pointed at its lower end and tubular at its upper end. The tubular portion of the stake is provided with two openings 12 leading into the hollow interior of the stake, these openings permitting air to pass into the interior of the upper portion of the stake and then pass upward and out, thus cooling the stake. The upper end of the stake may be flanged, as at 13 (see Figure 6). Preferably, though not necessarily, the lower end of the stake is cruciform in cross section so that it may be readily inserted in the ground and will not readily tip over. As hereafter described, the stake may be made in two sections, though I do not wish to be limited to this.

Adapted to be mounted upon the upper end of the stake is a supporting head 14. This head is cruciform in plan and the under face of the head is provided with a downwardly extending spindle 15, there being a shoulder 16 formed at the junction of the spindle with the head. The arms of the cruciform head are connected by a polygonal web 17 and the arms 18 of the head are formed at their extremities with the longitudinally extending recesses 19. Each of these recesses at its inner end has a downwardly and inwardly extending aperture or passage 20, as shown in Figure 1, and the end walls of this passage are downwardly and centrally beveled, the under faces of the arms being thickened or formed with lugs 21, which lugs form the lower wall of the recesses or sockets, as will be seen from Figure 3.

Coacting with the head are a plurality of grids, each being designated 22. Each grid consists of a plurality of annular members 23 and radial members 24 connecting the annular members and cast therewith. Each grid is formed with a radial arm 25 forming an extension of one of the radial members and this arm adjacent its end is downwardly and outwardly bent and then longitudinally extended, as at 26, the faces of the downwardly and outwardly extending portion of the arm being beveled to conform to the beveled face of the passage or opening 20 in the head (see Figure 1).

Thus it will be seen that the extremity of the arm 25 may be inserted in the socket 19 and engage beneath the central portion of the head, as shown in Figure 1, and that this will support the grid in a horizontal position, and this support is such that the grid cannot readily become accidentally detached and, on the other hand, a full support will be given to any weight which may be placed upon the grid. The spindle 15 is rotatable within the hollow upper end of the stake so that the four grids and the head may be rotated to any desired position. Obviously either one grid may be used, four grids, or any number between one and four. The annular members 23 of the grids and the radial members thereof are preferably formed to present a relatively sharp edge upward so as to provide the least possible surface which will come in contact with meat, bread or any other material which is placed for cooking upon these grids.

While, as before stated, I may make the upper portion of the stake and the lower portion of the stake integral, I preferably form the stake in two sections, the lower section of the stake being cruciform in cross section to be inserted in the ground and formed with an outwardly projecting shoulder 27, and the upper tubular portion 11 being of such diameter as to fit over the cruciform extension 28 of the stake 10. This tubular section 11 is formed with two ventilating openings 29 disposed adjacent their upper and lower ends so as to permit circulation of air within the upper portion of the stake so as to cool the stake. The provision of the shoulder 27 permits the stake to be readily forced down into the ground or permits this stake to be readily removed from the ground by striking one end and then the other of this part 27 with an ax until the hole is enlarged to permit the ready pulling out of the lower section of the stake. The cruciform portion 28, which with the portion 27 forms a driving head, may be struck with an ax or hammer and thus forced into the ground and any deformation of the upper end of this portion will not matter, whereas if the stake is tubular at its upper end and is driven into the ground by the blows of an ax or mallet, it is very liable to bend over the metal at the lower end of the tubular portion and to so deform it that the spindle will not fit in it properly and will not freely rotate therein. It is for this reason that it is preferably to form the stake in two sections, though, as before remarked, I do not wish to be limited to this.

It will be noted that the outer web 17 has re-entrant portions 30 which are concavely curved so as to fit against the outer annulus of each grid so that the grids when locked in place have a firm engagement with the rotatable head.

It will be seen that this cooker or utensil support is very light, strong, and is so constructed that it is not liable to break. It may be packed in a very small box or rolled up in a package and put under the seat of a car or in the tool box, as there is nothing to break or get out of shape, and it may be set up or knocked down in a moment or so. It will be seen that because the cooking grids are approximately diamond-shaped in cross section, there will be no flat surface to stick to and burn the steak, toast or other food which may be placed upon these grids for cooking. It will be obvious that there is no necessity of using more than one grid if only a small amount of cooking is to be done and that sets of grids may be used of different sizes, which grids are to be interchangeable on the supporting head 14.

I claim:—

1. A support of the character described comprising a stake, hollow at its upper end and pointed at its lower end for insertion into the ground, the hollow upper end of the stake having ventilating openings leading thereinto, a head having a centrally disposed spindle insertable into the hollow interior of the stake and formed to provide a plurality of radially extending sockets, and a plurality of grids each having an arm insertable into a socket, the arm having interlocking engagement with the socket.

2. A support of the character described comprising a stake having a tubular upper end perforated to permit the circulation of air, a head having a spindle insertable into the hollow upper end and rotatable therein, the head having a plurality of radiating arms and webs connecting said arms, each of said arms being formed with a radially extending socket, the rear end of the socket having a downwardly extending opening, and a plurality of grids, each grid having a radially extending arm, the outer end of which is downwardly and then outwardly extended to fit the socket and engage through said opening and interlock with the socket.

3. A support of the character described comprising a centrally disposed stake, a head detachably and rotatably engaged with the stake, the head having a plurality of radially extending arms connected by outwardly projecting webs, each arm being formed with a longitudinally extending socket, the rear end of the socket having a downwardly deflected opening, grids, each formed with a radial arm projecting beyond the grid, the extremity of the arm being downwardly extended and then longitudinally extended so as to fit within said socket and have interlocking engagement with the opening, the web connecting the arms on each side of the arms being re-entrantly curved and the grids having a peripheral curvature to fit said re-entrant curve of the web.

4. A support of the character described comprising a stake made in two telescopic sections, the lower section being sharp-pointed and provided midway of its length with an outwardly projecting shoulder and above said shoulder being formed with longitudinally extending channels, the upper section being hollow to surround the lower section of the stake and fit over these channels and rest upon said shoulder and being formed with ventilating openings in the upper end, and a utensil support carried by said upper section.

5. A support of the character described comprising a stake formed in two sections, the lower section of the stake being sharp-pointed and having a shoulder and a portion extending above the shoulder, the upper section of the stake being tubular and having ventilating openings, one of said openings being disposed at the upper end of the hollow stake, and a head having a centrally disposed spindle insertable into the hollow upper end of the second named portion of the stake, said head carrying a plurality of grids, that portion of the lower section of the stake projecting above the shoulder being cruciform in cross section to thus prevent any obstruction of the upper ventilating opening.

In testimony whereof I hereunto affix my signature.

LUKE C. DEAR.